US008145943B2

(12) United States Patent
Potkonjak (10) Patent No.: US 8,145,943 B2
(45) Date of Patent: Mar. 27, 2012

(54) STATE VARIABLE-BASED DETECTION AND CORRECTION OF ERRORS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 333 days.

(21) Appl. No.: 12/463,977

(22) Filed: May 11, 2009

(65) Prior Publication Data
US 2010/0287409 A1 Nov. 11, 2010

(51) Int. Cl.
*G09F 11/00* (2006.01)
(52) U.S. Cl. ............ 714/15; 714/47.1; 714/758; 703/22; 709/223; 340/870.21
(58) Field of Classification Search .................. 714/47.1, 714/758; 703/22; 709/223; 340/870.21
See application file for complete search history.

(56) References Cited

U.S. PATENT DOCUMENTS

| | | | |
|---|---|---|---|
| 5,550,749 A | 8/1996 | Dey et al. | |
| 5,553,000 A | 9/1996 | Dey et al. | |
| 6,128,656 A * | 10/2000 | Matchefts et al. | 709/223 |
| 6,643,815 B1 | 11/2003 | Davis et al. | |
| 7,606,695 B1 * | 10/2009 | Nouri et al. | 703/22 |
| 7,694,208 B2 * | 4/2010 | Ball | 714/784 |
| 2005/0066239 A1 * | 3/2005 | Keeton et al. | 714/47 |
| 2006/0026490 A1 | 2/2006 | Rinne et al. | |
| 2007/0168848 A1 | 7/2007 | Tschanz et al. | |
| 2008/0238717 A1 * | 10/2008 | Short et al. | 340/870.21 |
| 2008/0278138 A1 | 11/2008 | Wei | |

OTHER PUBLICATIONS

International Search Report and Written Opinion, mailed Aug. 19, 2010 for application No. PCT/US10/33609.
Chandrakasan et al., "Optimizing Power Using Transformations," IEEE Transactions on Computer-Aided Design of Integrated Circuits and Systems, Jan. 1995, vol. 14, No. 1, pp. 12-31.
Guerra et al., "A Methodology for Guided Behavioral-Level Optimization," Proceedings of the 35th Conference on Design Automation Conference, Jun. 1998, pp. 309-314.
Hong et al., "Power Optimization Using Divide-and-Conquer Techniques for Minimization of the Number of Operations," ACM Transactions on Design Automation of Electronic Systems, Oct. 1999, vol. 4, No. 4, pp. 405-429.
Kirovski et al., "A Quantitative Approach to Functional Debugging," International Conference on Computer-Aided Design, Nov. 1995, pp. 170-173.
Kirovski et al., "Cut-Based Functional Debugging for Programmable Systems-on-Chip," IEEE Transactions on Very Large Scale Integration (VLSI) Systems, Feb. 2000, vol. 8, No. 1, pp. 40-51.
Kirovski et al., "Improving the Observability and Controllability of Datapaths for Emulation-Based Debugging," IEEE Transactions on Computer-Aided Design of Integrated Circuits and Systems, Nov. 1999, vol. 18, No. 11, pp. 1529-1541.

(Continued)

*Primary Examiner* — Robert Beausoliel, Jr.
*Assistant Examiner* — Jeison C Arcos
(74) *Attorney, Agent, or Firm* — Schwabe, Williamson & Wyatt, P.C.

(57) ABSTRACT

Embodiments provide methods and apparatuses for detecting errors in a computation using state variables. In various embodiments, corrections of the errors through the state variables are also provided. In various embodiments, the disclosed techniques may be used for power and/or energy minimization/reduction, and debugging, among other goals. Other embodiments and/or applications may be disclosed and/or claimed.

33 Claims, 6 Drawing Sheets

OTHER PUBLICATIONS

Koushanfar et al., "Symbolic Debugging of Embedded Hardware and Software," IEEE Transactions on Computer-Aided Design of Integrated Circuits and Systems, Mar. 2001, Vol. 20, No. 3, pp. 392-401.

Potkonjak et al., "Design-For-Debugging of Application Specific Designs," International Conference on Computer-Aided Design, Nov. 1995, pp. 295-301.

Potkonjak et al., "Maximally and Arbitrarily Fast Implementation of Linear and Feedback Linear Computations," IEEE Transactions on Computer-Aided Design of Integrated Circuits and Systems, Jan. 2000, vol. 19, No. 1, pp. 30-43.

Potkonjak et al., "Optimizing Resource Utilization Using Transformations," IEEE Transactions on Computer-Aided Design of Integrated Circuits and Systems, Mar. 1994, vol. 13, No. 3, pp. 277-292.

Potkonjak et al., "Optimizing Throughput and Resource Utilization Using Pipelining: Transformation Based Approach," Journal of VSLI Signal Processing, 1994, vol. 8, pp. 117-130.

Srivastava et al., "Optimum and Heuristic Transformation Techniques for Simultaneous Optimization of Latency and Throughput," IEEE Transactions on Very Large Scale Integration (VLSI) Systems, Mar. 1995, vol. 3, No. 1, pp. 2-19.

* cited by examiner

Figure 1

100 4th Order Infinite Impulse Response (IIR) Biquad-Based Filter

STATE VARIABLE-BASED DETECTION AND CORRECTION OF ERRORS

BACKGROUND

Numerous design and operational objectives may exist to include latency, throughput, area, cost, and power. Relative importance of these design and operational objectives may change with trends in implementation technologies, applications, and support tools. However, these design and operational objectives or metrics may be relevant if the programmable or application specific design operates correctly. Therefore, the development of techniques and tools for error detection, diagnosis, and correction may be of a paramount importance. The importance of techniques and tools for error detection, diagnosis, and correction may even be higher in low power design and/or low power device operation and debugging, such as wireless and mobile systems that may operate under challenging conditions and strict computing resource and energy constraints. Other types of systems with emphasized importance include computers and communication devices used in data centers due to possible thermal sensitivities and continuous modes of operation.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to state variable based detection and/or correction of error. In various embodiments, the disclosed techniques may be used to correct permanent errors due to manufacturing variability.

The present disclosure includes a state variable based technique for error detection, diagnosis, characterization, and correction. In various embodiments, a set of state variables at a cut of a computation may be observed, analyzed, and corrected. In various embodiments, the observation, analysis, and correction may be performed in such a way that the correctness (either absolute or defined in terms of quality of service (QoS)) is maintained, while relevant metrics of interest such as latency, throughput, energy consumption, detection and correction may be optimized.

Figure 1:
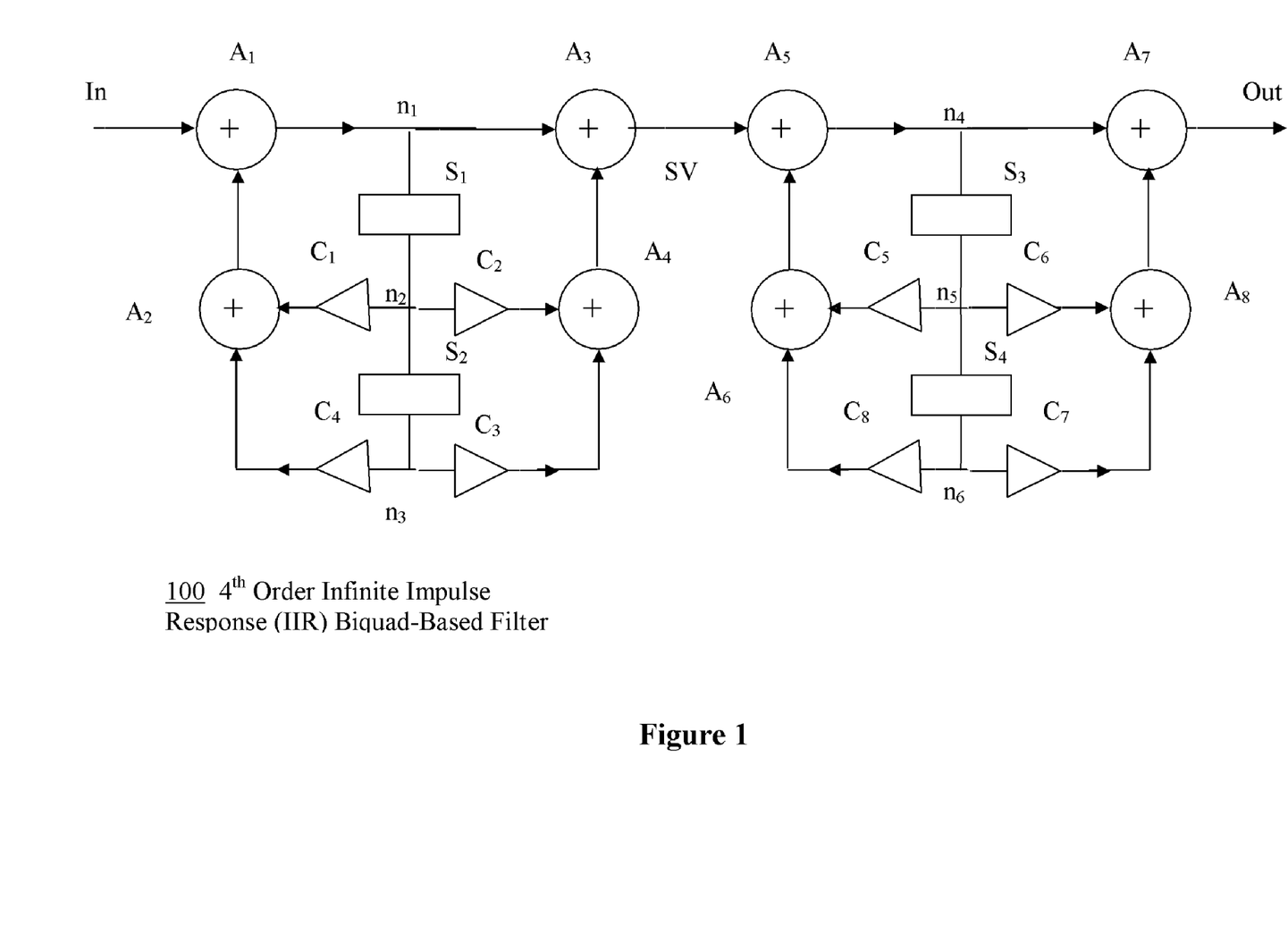
FIG. 1 illustrates state variable based detection and correction of errors in the context of an example circuit, in accordance with various embodiments.

Referring now to FIG. 1, wherein state variables based error detection and correction of errors in the context of an example circuit 100 are illustrated, in accordance with various embodiments of the present disclosure. Circuit 100 may be a $4^{th}$ order infinite impulse response (IIR) biquad-based filter that may be used in digital signal processing application, or may be found in a digital signal processor. As illustrated, circuit 100 includes a number of adders $A_1$ through $A_8$, a number of multipliers with associated coefficients $C_1$ through $C_8$ coupled with one another, and an input (In) and an output (Out). Further, for the embodiments, circuit 100 may be further provided with a number of state elements, disposed between nodes $n_1$ and $n_2$, $n_2$ and $n_3$, $n_4$ and $n_5$, and $n_5$ and $n_6$, respectively, to capture state variables S1, S2, S3 and S4, after a separate iteration of an operation.

Accordingly, circuit 100 may operate continuously in an infinite loop, with the semantics of synchronous data flow. In some embodiments, after iteration #1, $$S_1@1=In_1+C_1*S_1@0+C_3@0$$

$$S_2@1=S_1@0$$

$$SV_1=S_1@1_+C_2*S_1@0+C_3*S_2@0$$

$$S_3@1=SV_2+C_5*S_3@0+C_6*S_4@0$$

$$S_4@1=S_3@0$$

$$Out_2=S_3@1_+C_7*S_3@0+C_8*S_4@0$$

After iteration #2, $$S_1@2=In_2+C_1*S_1@1+S_4@1$$

$$S_2@2=S_1@1$$

$$SV_2=S_1@2_+C_2*S_1@1+C_3*S_2@1$$

$$S_3@2=SV_2+C_5*S_3@1+C_6*S_4@1$$

$$S_4@2=S_3@1$$

$$Out_2=S_3@2_+C_7*S_3@1+C_8*S_4@1$$

And so forth.

In some embodiments, to monitor for the correct performance of circuit 100 or to monitor for error, it may be sufficient to monitor (e.g., variables denoted by $S_1$, $S_2$, $S_3$, $S_4$, and Out), a relatively small and finite variable set. Further, the same variables may be used for correction of an arbitrary set of errors. An example variable set of $S_1$, $S_2$, $S_3$, $S_4$, and Out may not necessarily be the only variable set that may be employed to monitor for error. An alternative variable set may be formed and monitored, e.g., the variables that are outputs of adders $A_2$, $A_4$, $A_5$, $A_8$, $S_2$, $S_4$, and Out.

For the purpose of the present disclosure, variables $S_1$, $S_2$, $S_3$, $S_4$, and Out (or $A_2$, $A_4$, $A_5$, $A_8$, $S_2$, $S_4$, and Out) observed at the end of an iteration may be referred to as state variables observed at a cut of the computation. The state variables of a cut may define the computation after the cut. In various embodiments, a cut may be a full or complete cut, or a partial cut. A full or complete cut includes all state variables that define the computation after the cut, whereas a partial cut includes a subset of all the state variables.

A full or complete cut has the property that enables the full or complete cut to include sufficient state variables to detect and correct at least a substantial portion of errors in the computation. The full or complete cut may differ greatly in granularity. For example, one trivial cut consists of all state variables either in an odd or in an even iteration of the computation. Other, smaller or partial cuts may be formed by a subset of the state variables in an iteration. Note that it may not be necessary that state variables correspond to state elements denoted by rectangles in FIG. 1. For example, the outputs of additions $A_1$, $A_4$, $A_5$, $A_8$ and multiplications by $C_1$, $C_4$, $C_5$, and $C_6$ may form one such cut.

An example of a partial cut for circuit 100 may comprise the variables $S_1$ and $S_2$. Another example of a partial cut for circuit filter 100 may comprise the variables SV, $S_3$ and $S_4$. Of particular interest may be that a first partial cut may be sufficient to correct a large percentage of errors that are important to correct. In particular, this may be the case when coefficient for multiplications $C_1$, $C_2$, $C_3$, and $C_4$ are significantly larger than coefficients $C_5$, $C_6$, $C_7$, and $C_8$.

Therefore, depending on operation objectives, it might not be necessary to always monitor the set of variables of a full or complete cut.

Figure 2:
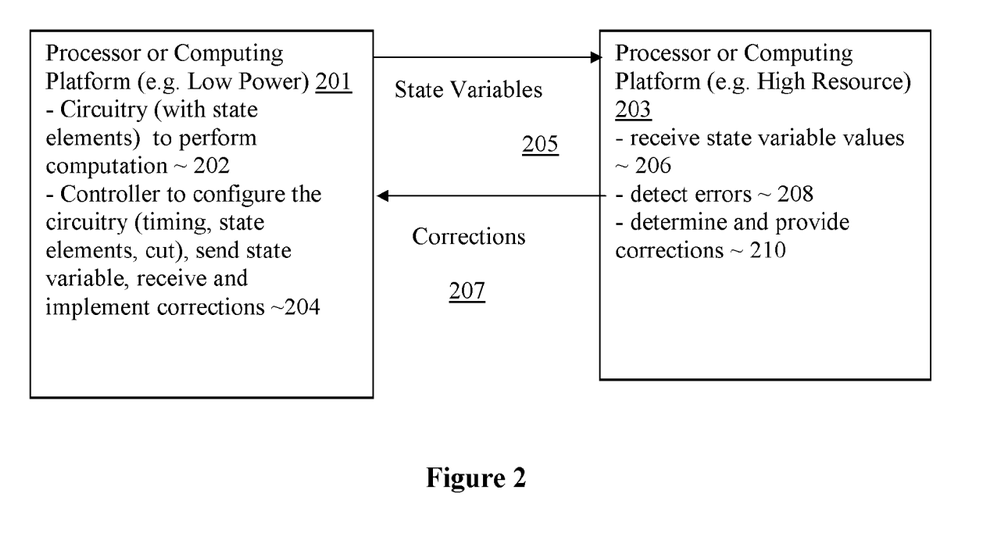
FIG. 2 illustrate two processors or computing platforms configured to practice state variable based detection and correction, in accordance with various embodiments.

Referring now to FIG. 2, wherein two processors or computing platforms configured to practice state variable based detection and correction, in accordance with various embodiments, is illustrated. As shown, processor or computing platform 201 includes circuitry 202 having a number of state elements for performing various computations. Processor or computing platform 201 also includes a controller 204 to configure the circuitry 202 with a set of state element to perform a computation. Controller 204 is configured to monitor the computation through a set of state variables corresponding to the state elements included in the configuration for performing the computation, e.g., as described above for FIG. 1. Processor or computing platform 203 may be provided to complement processor or computing platform 201. Processor or computing platform 201 may be energy, computing resource, design or manufacturing constrained, possibly resulting in an increase in likelihood of error. Whereas, processor or computing platform 203 may have more access to energy or computing resources etc., and may be more robust against large set of errors.

In various embodiments, processor or computing platform 201 is configured to capture state variables at a cut of a computation, and send state variables 205 to processor or computing platform 203. As alluded to earlier, the cut may be a full/complete or a partial cut of the computation. In various embodiments, on receipt 206, processor or computing platform 203 analyzes the received state variables, and detects 208 for errors based on the result of the analysis. In various embodiments, processor or computing platform 203 further diagnosis the errors, creates corrections 210 to correct one or more of the detected errors, and sends 210 corrections 207 to processor or computing platform 201.

In various embodiments, processor or computing platform 203 may be provided with the same program and input data to generate the corresponding state variables at the cut for error detection and correction. In various embodiments, processors or computer platforms 201 and 203 may be independently or separately provided with the program and input data to be executed. In various embodiments, on receipt, processor or computing platform 203 analyzes the received variable values, and detects for errors based on the result of the analysis. In various embodiments, processor or computing platform 203 may further diagnosis the errors, creates corrections to correct one or more of the detected errors, and sends corrections 207 to processor or computing platform 203. Corrections 207 may instruct processor or computing platform 203 on how to correct the detected errors.

In alternate embodiments, the processor or computing platform 203 may characterize processor or computing platform 201 in terms of its faults, simulates or emulates its execution and sends the required corrections to correct errors. The corrections may be either data dependent or generic for a pertinent program.

In various embodiments, the present disclosure may be practiced in an off-line manner; in other embodiments, the present disclosure may be practiced in an on-line manner. In an on-line embodiment, the data may be transferred between the involved devices using either wired or wireless communication.

Before further describing embodiments of the present disclosure, it should be noted that for the purpose of this specification, what may be considered errors are not limited to errors on the execution units, in the relevant datapaths, or datapaths themselves, but may include errors of various types of interconnect, memory elements, clock circuitry, power distribution network or other types of devices that may participate in data processing, storage, communication, or acquisition.

In various embodiments, processor or computing platform 201 may be a wireless computing device such as a mobile phone, a media player, a laptop computer, a personal digital assistant, and so forth. Processor or computing platform 203 on the other hand may be any one of a number of servers. The two processor or computing platforms 201 and 203 may be coupled to each other via wired and/or wireless networks. In various embodiments, in particular, real-time embodiments having real-time operational requirements, fast communication between the computing platforms, and fast processing may be made available to enable meeting the real-time operational requirements.

In some embodiments, detected errors may be transitive or permanent, and may be caused by design or manufacturing. Detected errors may also occur in various applications, e.g. wireless circuits, digital signal processing circuits, encoding/decoding circuits, compression/decompression circuits, encryption/decryption circuits. In various embodiments, as alluded to in the descriptions for earlier illustrations, the number of error corrections may be minimized. A benefit from employing minimal number of error corrections may be that the corrections may be easier to compress and decompress.

In various embodiments, errors may be detected and in turn, corrected, by altering data that may serve as input to a program executed on a programmable processor or altering data that may be processed by an application specific processor. In various embodiments, the computational errors may be corrected, or substantially corrected as required by QoS criteria, by altering as small as possible number of (primary) inputs.

Figure 3:
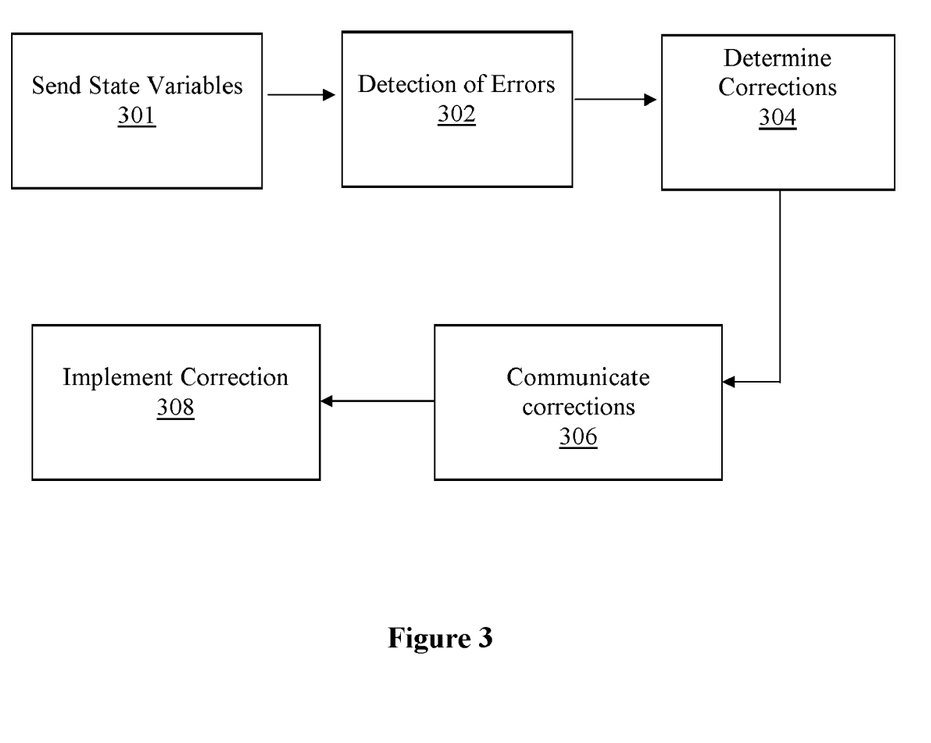
FIG. 3 illustrates a method of the present disclosure, in accordance with various embodiments.

Referring now to FIG. 3, a method of the present disclosure, in accordance with various embodiments is disclosed. For the embodiments, the disclosed approach may include up to five subtasks, to improve e.g. the energy consumption or other design or operational objectives (e.g. resiliency against soft errors):

(i) Send State Variable (301)
(ii) Detection of errors (302);
(iii) Determine corrections (304);
(iv) Communicate corrections (306); and
(v) Implement corrections (308).

In various embodiments, both the program and input data are assumed known in advance. Therefore, all four subtasks may be executed in off-line mode.

In various embodiments, as alluded to earlier, error detection and correction determination (e.g., subtasks 302 and 304) may be performed when significant or substantial energy or computing resources are available.

In various embodiments, complete correctness or error-free results may be required. However, in other embodiments, that is, for applications such as audio and video streams, sensor networks, graphics, gamming, and so forth, it may be sufficient to maintain either an objective or a subjective QoS metric. In various environments, a QoS metric may be expressed as one of error norms. In various embodiments, the profile of a specific user in terms of a specified QoS metric or the maximal energy spent on a particular program execution metric may be targeted. In various embodiments, QoS and consumed energy in primal/dual framework may be treated where one of the metrics may be defined as a constraint and the other metric may be subject to optimization. The present disclosure may also be applicable for optimization of other metrics such as latency of error correction(s).

In various embodiments, a goal may be to create an error correction that may be easy to compress and inexpensive (e.g., low energy or computing resources consumption) for decompression. Possible ways to accomplish this goal may include imposing a constraint or adding a term in an objective function that enforces or induces error corrections by the same value. In addition, in various embodiments, inputs overcompensation in such a way that a single alternation of one or more inputs may be conducted so that two or more outputs are corrected simultaneously within a specified tolerance.

In various embodiments, special attention may be placed to input alternations for error correction in linear systems. For these types of systems, the provably optimal correction in terms of the corrected number of variables may be computed using linear programming or other techniques for solving systems of linear equations, such as Gaussian elimination and singular value decomposition.

In various embodiments, error correction is performed by overwriting all the cut state variables that are incorrect with their correct values. In various embodiments, the cut with smallest cardinality to perform the corrections may be found. This embodiment may also aim to correct state variables that differ more than the specified value a case where a QoS metric is targeted. In some embodiments it may be desirable to correct a computational result at a place where an error was possibly diagnosed.

In various embodiments, error correction may target linear computations or parts of the linear computations. In this embodiment, the smallest number of error corrections may be calculated by solving a system of linear equations. Each variable to the computations may be one variable in the corresponding set of linear equations. The result of each operation may create one equation. In various embodiments, linear programming may be employed to find the best places (intermediate or output variables in the original functionality) for error corrections. In the case of non-linear computation, in various embodiments, the same procedure may be conducted using approaches for solving the systems of non-linear equations, including Gauss Jordan method or nonlinear programming techniques such as steepest descent, conjugate gradient, and Powel method.

In various embodiments, the effectiveness of an error detection and correction approach may be further enhanced by using compiler and behavioral synthesis transformations such as retiming and software or functional pipelining. In addition, other transformations, including algebraic transformations (e.g. associativity, distributivity) and loop transformations, may be used to reduce the number of state variables in a cut. The other transformations may also be used for other purposes required by the state variable-based techniques for error detection, diagnosis, characterization, and correction.

The state variable-based techniques for error detection, diagnosis, characterization, and correction may be used in conjunction with other optimization techniques that may target a specific design or operational metrics such energy minimization. For example, it can be used to improve performance of variable supply and/or threshold voltages management techniques.

The state variable-based techniques for error detection, diagnosis, characterization, and correction can be also used for correcting functionality and timing faults due to manufacturing variability that may make an integrated circuit of a particular design unique in terms of properties on transistors and interconnects. Under current manufacturing, in order to keep integrated circuits relatively fast and maintain a low operating power yet maintain a high manufacturing yield, a small subset of device elements are often either faulty or too slow. In various embodiments, functionality implemented using application specific devices or programs executed on a programmable processor may be corrected using the above described state variable-based techniques for error detection, diagnosis, characterization, and corrections. In various embodiments, an error regardless of the actual data that is consumed by the functionality or the program may be corrected. In various embodiments, the above described state variable based error detection and correction may target a circuit subject to manufacturing variability, where the detection and correction may be applicable to an entire family of devices or systems having the circuit.

Figure 4:
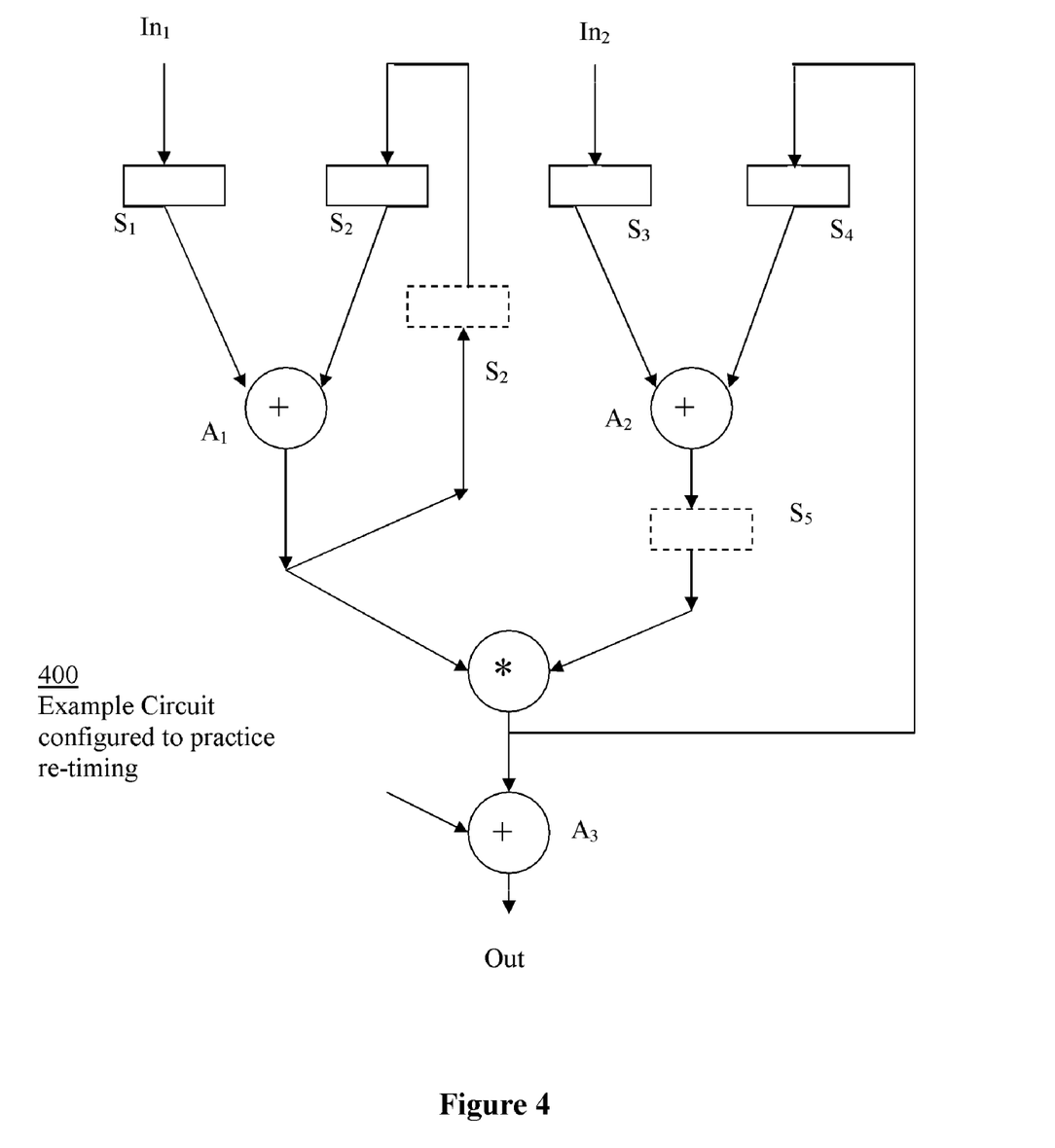
FIG. 4 illustrates additional aspects of state variable based detection and correction of errors in the context of another example circuit, including re-timing, in accordance with various embodiments.

FIG. 4 illustrates additional aspects of state variable based detection and correction of errors in the context of another example circuit, including re-timing, in accordance with various embodiments. Retiming may be used to further enhance the error detection, diagnosis, characterization, and correction techniques described in the present disclosure. As illustrated in FIG. 4, example circuit 400 includes a number of adders $A_1$, $A_2$ and $A_3$, and a multiplication circuit $M_1$ coupled to each other as shown. In various embodiments, circuit 400 may be configured to operate with a first timing configuration. For the timing configuration, circuit 400 would be configured with a set of state variables $S_1$, $S_2$, $S_3$ and $S_4$ to facilitate capture and monitoring of the state variables.

In various embodiments, for some circuits, such as example circuit 400, it may be possible to reconfigure a circuit to operate with another timing configuration, in particular, a configuration under which a smaller set of variables may be monitored to satisfy a QoS metric or other type of metric. For example, after a retiming configuration, the set of variables for circuit 400 may be reduced to a smaller set of variables that includes $S_2$ and $S_4$. Note that in this example, the Out variable is not included in the set of variables, therefore, error correction may have to be in a consecutive or subsequent iteration, and not in the current iteration.

In addition to timing reconfiguration, in some embodiments, error detection, diagnosis, characterization, and correction may also be practiced with pipelining, that may be implemented by introducing additional elements into a computation to improve throughput, reduce energy, or improve some other set of operational and design metrics. Similarly, as timing configuration, the goal is to introduce the additional elements in a manner, so the set of state variables required to be monitored is reduced.

Figure 5:
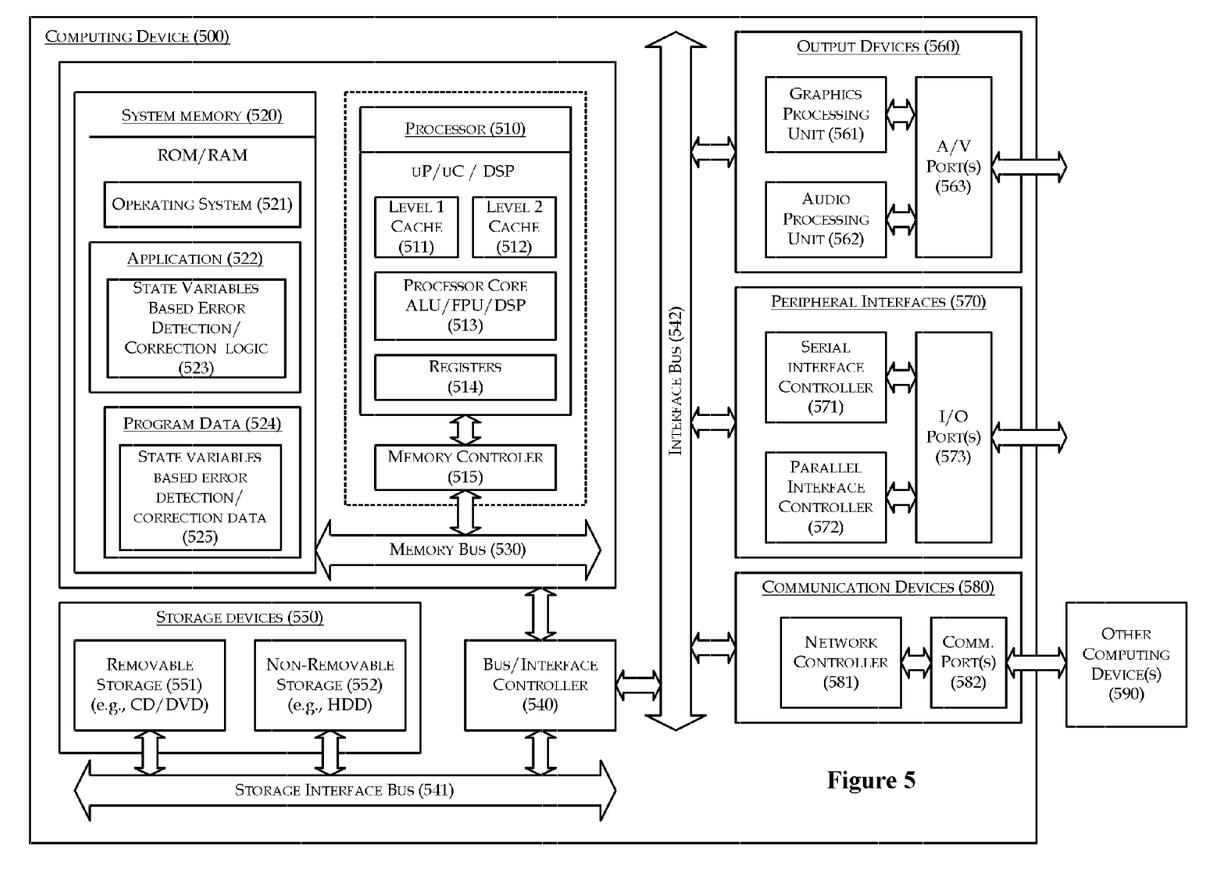
FIG. 5 illustrates a computing system configured in accordance with various embodiments.

FIG. 5 is a block diagram illustrating an example computing device configured in accordance with the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 12, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include programming instructions providing logic to implement the above described state variables based error detection and correction. Program Data 524 may include the applicable state variable and related values.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

Figure 6:
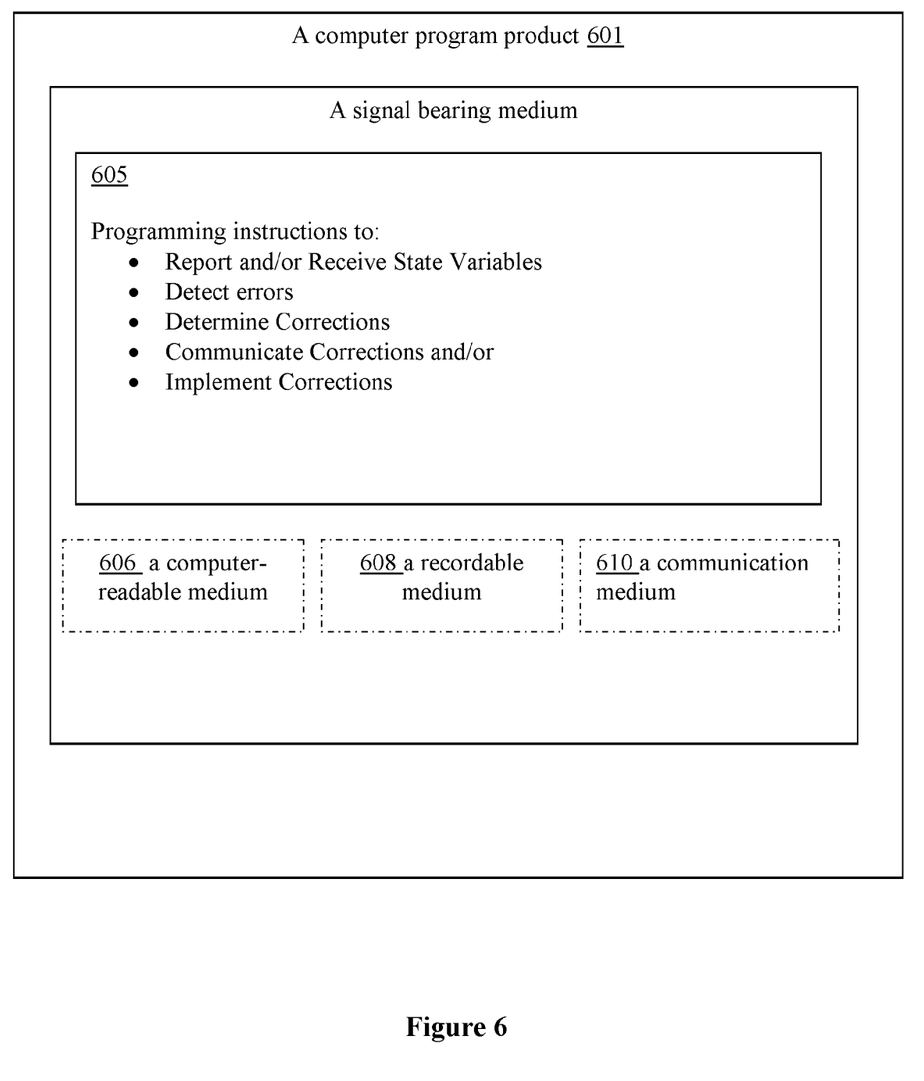
FIG. 6 illustrates a computing program product configured in accordance with various embodiments.

FIG. 6 illustrates a block diagram of an example computer program product 600, all arranged in according to the present disclosure. In some examples, as shown in FIG. 6, computer program product 600 includes a signal bearing medium 602 that may also include programming instructions 604. Programming instructions 604 may be for reporting and/or receiving one or more current values of a set of one or more state variables of a cut of a computation performed on another computing platform using one or more input data, where the set of one or more state variables define the computation after the cut. Programming instructions 604 may also be for detecting one or more errors of the computation performed on the another computing platform, based at least in part on the set of one or more state variables of the cut of the computation. Further, programming instructions 604 may be for determining a set of one or more corrections, and communicating to the another computing platform, the set of one or more corrections. In some embodiments, programming instructions 604 may also be for implementing a set of provided corrections.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute programming instructions 604 to be executed by logic. Computer readable medium 606 and recordable medium 608 may include, but are not limited to, a flexible disk, a hard disk drive (HDD), a Compact Disc (CD), a Digital Video Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter may not be limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software may generally (but not always, in that in certain contexts the choice between hardware and software can become significant) a design choice representing cost vs. efficiency tradeoffs. There may be various vehicles by which processes and/or systems and/or other technologies described herein may be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices (e.g., nodes, RF controller, computing device, etc.) and/or methods into data processing systems. That is, at least a portion of the devices and/or methods described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This application is intended to cover any adaptations or variations of the embodiments discussed herein. Therefore, it is manifestly intended that embodiments of the disclosure be limited only by the claims and the equivalents thereof.

What is claimed is:

1. A method comprising:
receiving by a first computing platform, one or more current values of a set of one or more state variables of a cut of a computation performed on a second computing platform using one or more input data, wherein the set of one or more state variables define the computation after the cut; and
detecting by the first computing platform, one or more errors of the computation performed on the second computing platform, detecting being based, at least in part, on the set of one or more state variables of the cut of the computation;
wherein the computation is independently performed on the second computing platform, and except for detecting error by the second computing platform for the first computing platform, the computation is computationally unassociated with the first computing platform.

2. The method of claim 1, further comprising:
determining by a third computing platform, a set of one or more corrections; and
providing by the third computing platform, the set of one or more corrections to the second computing platform;
wherein the first and third computing platforms are different computing platforms.

3. The method of claim 1, wherein determining comprises solving a system of linear equations having a plurality of variables, wherein a separate state variable from among the one or more state variables corresponds to a variable for the system of linear equations.

4. The method of claim 1, further comprising the first computing platform performing the same computation on the first computing platform using the same one or more input data, and the first computing platform capturing corresponding one or more current values of the set of one or more state variables of a corresponding cut of the computation performed on the first computing platform.

5. The method of claim 4, wherein detecting comprises comparing the one or more current values of the set of one or more state variable of the cuts of the computations performed on the second and first computing platforms, respectively.

6. The method of claim 1, wherein the cut comprises a full cut including all state variables defining the computation after the cut.

7. The method of claim 1, wherein the cut comprises a partial cut including a subset of all state variables defining the computation after the cut.

8. The method of claim 1, wherein the computation is performed under a first timing configuration of the second computing platform, and the method further comprises repeating the receiving, detecting, determining and providing for the computation performed under a second timing configuration of the second computing platform, wherein the first and second timing configurations are different.

9. The method of claim 8, wherein the computation is performed on the second computing platform with a first set of state elements, and the method further comprises repeating the receiving, detecting, determining and providing for the computation performed on the second computing platform with a second set of state elements, wherein the first and second state elements are different, and wherein the first and second set of state elements correspond to a first and a second set of state variables.

10. The method of claim 1, wherein the computation is performed on the second computing platform with a first set of state elements, and the method further comprises repeating the receiving, detecting, determining and providing for the computation performed on the second computing platform with a second set of state elements, wherein the first and second state elements are different, and wherein the first and second set of state elements correspond to a first and a second set of state variables.

11. A method comprising:
performing a computation, by a first computing platform, using one or more input data;
capturing one or more current values of a set of one or more state variables of a cut of the computation, by the first computing platform, wherein the set of one or more state variables define the computation after the cut; and
sending the captured one or more current values of the set of one or more state variables of the cut of the computation from the first computing platform to a second computing platform for the second computing platform to detect one or more errors of the computation performed on the first computing platform, and to provide corrections to the first computing platform for one or more of the detected errors
wherein the computation is independently performed on the first computing platform, and except for detecting error by the first computing platform for the second computing platform, the computation is computationally unassociated with the second computing platform.

12. The method of claim 11, wherein the cut is a full cut comprising all state variables defining the computation after the cut.

13. The method of claim 11, wherein the cut is a partial cut comprising a subset of all state variables defining the computation after the cut.

14. The method of claim 11, wherein the computation is performed under a first timing configuration of the second computing platform, and the method further comprises repeating the performing, capturing and sending for the computation performed under a second timing configuration of the second computing platform, wherein the first and second timing configurations are different timing configurations.

15. The method of claim 11, wherein the computation is performed on the first computing platform with a first set of state elements, and the method further comprises repeating the performing, capturing and sending for the computation performed on the first computing platform with a second set of state elements, wherein the first and second state elements are different.

16. The method of claim 11, further comprising receiving the corrections for one or more of the detected errors, wherein the corrections comprise a set of correction variables.

17. The method of claim 11, wherein the performing, capturing and sending are performed to optimize a design metric for the first computing platform, wherein the design metric includes a selected one of latency, throughput, or power.

18. The method of claim 11, wherein the performing, capturing and sending are performed to meet one or more quality of service criteria for the first computing platform.

19. The method of claim 11, wherein the first computing platform is a wireless mobile computing platform, whereas the second computing platform is a server computing platform.

20. The method of claim 11, wherein the first computing platform operates with an energy consumption rate that is smaller than an operational energy consumption rate of the second computing platform.

21. An apparatus comprising:
a processor to execute programming instructions; and
a storage device coupled to the processor, and having stored therein a plurality of programming instructions to be executed by the processor, wherein when executed by the processor, the programming instructions enable the apparatus
to receive one or more current values of a set of one or more state variables of a cut of a computation performed on another computing platform using one or more input data, wherein the set of one or more state variables define the computation after the cut; and
to detect for one or more errors of the computation performed on the second computing platform, detecting being based at least in part, on the set of one or more state variables of the cut of the computation performed on the another computing platforms;
wherein the computation is independently performed on the other computing platform, and except for detecting error by the apparatus for the other computing platform, the computation is computationally unassociated with the apparatus.

22. The apparatus of claim 21, wherein the programming instructions further enable the apparatus:
to determine a set of one or more corrections; and
to provide to the another computing platform, the set of one or more corrections.

23. The apparatus of claim 22 wherein the programming instructions are configured to enable the apparatus to determine by solving a system of linear equations having a plurality of variables, wherein a separate state variable from among the one or more state variable corresponds to a variable of for the system of linear equations.

24. The apparatus of claim 21, wherein the apparatus has either better access to energy or more computing resources than the another computing platform.

25. An apparatus comprising:
circuitry to perform a computation, using one or more input data, including one or more state elements to capture one or more current values of the computation to provide a set of one or more state variables of a cut of the computation, wherein the set of one or more state variables define the computation after the cut; and
a controller coupled to the circuitry and configured to send the captured one or more current values of the set of one or more state variables of the cut of the computation from the apparatus to another computing platform for the another computing platform to detect one or more errors of the computation performed on the apparatus, and for the another computing platform to provide to the apparatus corrections for one or more of the detected errors
wherein the computation is independently performed on the apparatus, and except for detecting error by the other computing platform for the apparatus, the computation is computationally unassociated with the other computing platform.

26. The apparatus of claim 25, wherein the controller is further equipped to configure the circuitry in a first timing configuration to perform the computation, and configure the circuitry in a second timing configuration to re-perform the computation, wherein the first and second timing configurations are different timing configurations.

27. The apparatus of claim 25, wherein the controller is further equipped to configure the circuitry with a first set of state elements to perform the computation, and configure the circuitry with a second set of state elements to re-perform the computation, wherein the first and second set of state elements are different, and the first and second set of state elements correspond to a first and a second set of state variables.

28. The apparatus of claim 25, wherein the apparatus is a wireless mobile computing platform, and the another computing platform is a server computing platform.

29. An article of manufacture comprising:
a computer readable medium; and
programming instructions stored in the computer readable medium, and configured to program and enable a first computing platform to:
receive one or more current values of a set of one or more state variables of a cut of a computation performed on a second computing platform using one or more input data, wherein the set of one or more state variables define the computation after the cut;
detect for one or more errors of the computation performed on the second computing platform, wherein detection is based, at least in part, on the set of one or more state variables of the cut of the computation;
determine a set of one or more corrections; and
provide to the second computing platform, the set of one or more corrections;
wherein the computation is independently performed on the second computing platform, and except for detecting error by the first computing platform for the second computing platform, the computation is computationally unassociated with the first computing platform.

30. An article of manufacture comprising:
a computer readable medium; and
programming instructions stored in the computer readable medium, and configured to program and enable a first computing platform to
configure the first computing platform to perform a computation with an arrangement of state elements;
capture one or more current values of the state elements to provide a set of one or more state variable values of a cut of the computation performed under the configured state element arrangement wherein the set of one or more state variables define the computation after the cut; and
send the captured one or more current values of the set of one or more state variables of the cut of the computation to a second computing platform for the second computing platform to detect one or more errors of the computation performed on the first computing platform under the configured state element arrangement, and for receiving back from the second computation platform corrections for one or more of the detected errors;
wherein the computation is independently performed on the first computing platform, and except for detecting error by the second computing platform for the first computing platform, the computation is computationally unassociated with the second computing platform.

31. The method of claim 1, further comprising:
determining by the first computing platform, a set of one or more corrections; and
providing by the first computing platform, the set of one or more corrections to the second computing platform.

32. The method of claim 16, wherein receiving the corrections comprises receiving the corrections for the one or more of the detected errors, from the first computing platform.

33. The method of claim 16, wherein receiving the corrections comprises receiving the corrections for the one or more of the detected errors, from a third computing platform, wherein the first and third computing platforms are different computing platforms.

* * * * *

UNITED STATES PATENT AND TRADEMARK OFFICE
CERTIFICATE OF CORRECTION

PATENT NO. : 8,145,943 B2  
APPLICATION NO. : 12/463977  
DATED : March 27, 2012  
INVENTOR(S) : Potkonjak Page 1 of 2

It is certified that error appears in the above-identified patent and that said Letters Patent is hereby corrected as shown below:

On the Title Page, in the Figure, delete "  " and insert --  --, therefor.

On the Title Page, in the Figure, below Box "510", in Line 1, delete "uP/uC" and insert -- µP/µC --, therefor.

On the Title Page, in the Figure, in Box "515", in Line 1, delete "CONTROLER" and insert -- CONTROLLER --, therefor.

On Title Page 2, in Item (56), under "OTHER PUBLICATIONS", in Column 2, Line 5, delete "VSLI" and insert -- VLSI --, therefor.

In the Drawings

In Fig. 3, Sheet 3 of 6, in Box, "308", Line 1, delete "Correction" and insert -- Corrections --, therefor.

In Fig. 5, Sheet 5 of 6, below Box "510", in Line 1, delete "uP/uC" and insert -- µP/µC --, therefor.

In Fig. 5, Sheet 5 of 6, in Box "515", in Line 1, delete "CONTROLER" and insert -- CONTROLLER --, therefor.

Signed and Sealed this  
Sixth Day of May, 2014

Michelle K. Lee  
*Deputy Director of the United States Patent and Trademark Office*

CERTIFICATE OF CORRECTION (continued)
U.S. Pat. No. 8,145,943 B2

In Fig. 5, Sheet 5 of 6, delete "  " and insert -- -- , therefor.

In Fig. 6, Sheet 6 of 6, delete "601" and insert -- 600 --, therefor.

In Fig. 6, Sheet 6 of 6, delete "A signal bearing medium" and insert -- A signal bearing medium 602 --, therefor.

In Fig. 6, Sheet 6 of 6, delete "605" and insert -- 604 --, therefor.

In Fig. 6, Sheet 6 of 6, in Box "610", in Line 1, delete "communication" and insert -- communications --, therefor.

In the Specifications

In Column 7, Line 53, delete "(HDD)," and insert -- (HDDs), --, therefor.

In Column 7, Line 55, delete "(SSD)," and insert -- (SSDs), --, therefor.

In Column 7, Line 65, delete "(DVD)" and insert -- (DVDs) --, therefor.

In the Claims

In Column 13, Line 20, in Claim 11, delete "errors" and insert -- errors; --, therefor.

In Column 14, Line 14, in Claim 21, delete "platforms;" and insert -- platform; --, therefor.